(12) United States Patent
Miller et al.

(10) Patent No.: US 8,362,873 B2
(45) Date of Patent: Jan. 29, 2013

(54) CONTROL OF EQUIPMENT USING REMOTE DISPLAY

(75) Inventors: Brian Scott Miller, Charleston, WV (US); Jack Vaughan, Charleston, WV (US); Oscar Allen LaDriere, Charleston, WV (US); Gino DiSimone, Reno, NV (US)

(73) Assignee: Deadman Technologies, LLC, Charleston, WV (US)

( * ) Notice: Subject to any disclaimer, the term of this patent is extended or adjusted under 35 U.S.C. 154(b) by 970 days.

(21) Appl. No.: 12/041,168

(22) Filed: Mar. 3, 2008

(65) Prior Publication Data

US 2008/0229409 A1    Sep. 18, 2008

Related U.S. Application Data

(60) Provisional application No. 60/892,312, filed on Mar. 1, 2007.

(51) Int. Cl.
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |

(52) U.S. Cl. ...... 340/5.52; 340/5.74; 340/5.8; 340/5.81; 340/5.82; 340/5.83; 340/3.1; 340/5.53

(58) Field of Classification Search .................. 340/5.52, 340/5.74, 5.8, 5.81, 5.82, 5.83, 3.1, 5.53, 340/825.69, 825.72

See application file for complete search history.

(56) References Cited

U.S. PATENT DOCUMENTS

| 3,381,922 | A | * | 5/1968 | Laing ............................ 244/136 |
| 4,319,333 | A | | 3/1982 | Hedrick |
| 4,463,339 | A | * | 7/1984 | Frick et al. .................... 340/906 |
| 4,546,211 | A | * | 10/1985 | Fane, III .................. 379/357.04 |
| 4,731,730 | A | | 3/1988 | Hedrick et al. |
| 4,764,981 | A | * | 8/1988 | Miyahara et al. ............... 398/33 |
| 4,825,209 | A | * | 4/1989 | Sasaki et al. ............... 340/12.55 |
| 5,128,517 | A | * | 7/1992 | Bailey et al. ................. 219/506 |
| 5,415,551 | A | * | 5/1995 | Semenza ...................... 434/226 |

(Continued)

FOREIGN PATENT DOCUMENTS

| EP | 1494164 | 1/2005 |
| WO | WO-2006063392 | 6/2006 |

(Continued)

*Primary Examiner* — George Bugg
*Assistant Examiner* — Paul Obiniyi
(74) *Attorney, Agent, or Firm* — Gifford, Krass, Sprinkle, Anderson & Citkowski, P.C.; Douglas L. Wathen

(57) ABSTRACT

An example display unit for facilitating operation of equipment includes a housing, an electronic display supported by the housing, and an electronic circuit located within the housing. The display unit may include one or more data receivers, such as a wireless receiver and/or an electrical interface. A biometric scanner, including a biometric sensor and proving an authorization signal when an authorized biometric input is detected by the biometric sensor, may be configured to electrically (and optionally mechanically) interconnect to the display unit. The example display unit receives an authorization status for operation of the equipment from the biometric scanner, and displays the authorization status and operational parameters relating to equipment use on the electronic display.

15 Claims, 9 Drawing Sheets

U.S. PATENT DOCUMENTS

| | | | |
|---|---|---|---|
| 5,711,456 A | 1/1998 | Bryant | |
| 5,719,950 A | 2/1998 | Osten et al. | |
| 5,957,148 A | 9/1999 | Sell | |
| 6,130,726 A * | 10/2000 | Darbee et al. | 348/734 |
| 6,141,436 A * | 10/2000 | Srey et al. | 382/124 |
| 6,186,196 B1 | 2/2001 | Leigh et al. | |
| 6,213,083 B1 * | 4/2001 | Winberg | 123/198 DB |
| 6,229,908 B1 | 5/2001 | Edmonds, III et al. | |
| 6,324,650 B1 | 11/2001 | Ogilvie | |
| 6,327,376 B1 | 12/2001 | Harkin et al. | |
| 6,609,534 B1 | 8/2003 | Beaney et al. | |
| 6,788,928 B2 | 9/2004 | Kohinata et al. | |
| 6,799,726 B2 | 10/2004 | Stockhammer et al. | |
| 6,810,310 B1 | 10/2004 | McBain | |
| 6,836,556 B1 | 12/2004 | Bromba et al. | |
| 6,900,736 B2 * | 5/2005 | Crumb | 340/12.5 |
| 7,222,360 B1 * | 5/2007 | Miller | 726/3 |
| 7,388,466 B2 * | 6/2008 | Ghabra et al. | 340/5.61 |
| 2001/0026546 A1 | 10/2001 | Schieder et al. | |
| 2002/0131637 A1 * | 9/2002 | Hu et al. | 382/181 |
| 2003/0032407 A1 | 2/2003 | Mages | |
| 2003/0069648 A1 * | 4/2003 | Douglas et al. | 700/2 |
| 2003/0159044 A1 * | 8/2003 | Doyle et al. | 713/176 |
| 2003/0174049 A1 | 9/2003 | Beigel et al. | |
| 2004/0016811 A1 * | 1/2004 | Fernandez et al. | 235/462.01 |
| 2004/0049325 A1 * | 3/2004 | Flick et al. | 701/2 |
| 2004/0059923 A1 | 3/2004 | ShamRao | |
| 2004/0148039 A1 | 7/2004 | Farchmin et al. | |
| 2004/0156327 A1 | 8/2004 | Yankielun et al. | |
| 2004/0264743 A1 | 12/2004 | Arnouse | |
| 2005/0021982 A1 * | 1/2005 | Popp et al. | 713/184 |
| 2005/0258686 A1 * | 11/2005 | Hiramitsu et al. | 307/10.1 |
| 2005/0269401 A1 * | 12/2005 | Spitzer et al. | 235/380 |
| 2005/0269402 A1 * | 12/2005 | Spitzer et al. | 235/380 |
| 2006/0013446 A1 * | 1/2006 | Stephens | 382/115 |
| 2006/0184656 A1 * | 8/2006 | Roddy | 709/223 |
| 2006/0213982 A1 | 9/2006 | Cannon et al. | |
| 2006/0236119 A1 * | 10/2006 | Bobbitt | 713/186 |
| 2006/0274920 A1 * | 12/2006 | Tochikubo et al. | 382/124 |
| 2007/0055888 A1 | 3/2007 | Miller et al. | |
| 2007/0199020 A1 * | 8/2007 | Kim et al. | 725/39 |
| 2008/0065449 A1 * | 3/2008 | Blagg et al. | 705/8 |
| 2008/0122577 A1 * | 5/2008 | Gutta et al. | 340/5.52 |
| 2008/0205714 A1 * | 8/2008 | Benkley et al. | 382/126 |
| 2008/0219521 A1 * | 9/2008 | Benkley et al. | 382/124 |
| 2008/0240523 A1 * | 10/2008 | Benkley et al. | 382/126 |
| 2008/0270163 A1 * | 10/2008 | Green | 705/1 |
| 2010/0263038 A1 * | 10/2010 | Nagatomo | 726/9 |

FOREIGN PATENT DOCUMENTS

| | | |
|---|---|---|
| WO | WO-2007019605 | 2/2007 |

\* cited by examiner

CONTROL OF EQUIPMENT USING REMOTE DISPLAY

REFERENCE TO RELATED APPLICATION

This application claims priority from U.S. Provisional Patent Application Ser. No. 60/892,312, filed Mar. 1, 2007, the entire content of which is incorporated herein by reference.

FIELD OF THE INVENTION

The invention relates to methods and apparatus for operating equipment, including methods and apparatus for allowing operation of equipment by authorized persons.

BACKGROUND OF THE INVENTION

Under typical aviation regulations, a deadman switch should be used when performing any pressure fueling or tender filling operation. Deadman switches are designed to safeguard against circumstances or situations that may delay the suspension of fuel flow. Preferably, a deadman switch should not be jammed or bypassed during any fuel transfer operation. Deadman switch types include the electric deadman switch, pneumatic deadman switch (sometimes called an air deadman switch), and combination air/pneumatic types. The deadman switch is actuated, for example through being in the hands of the operator, during a refueling process.

However, a conventional deadman switch provides no method of identifying the operator and so may be used by any person, even those not authorized or trained to use the equipment. Also, conventional equipment controls are often susceptible to jamming or locking in an operating position.

There are also many other circumstances where an authorized person such as an authorized operator needs to be in proximity to the equipment or operation. These circumstances may include any hazardous operation (such as a fueling operation), operation of equipment, medical monitoring situations, operation of equipment requiring some kind of safety interlock system, and the like. Conventional equipment control methods generally do not attempt to identify an authorized operator.

SUMMARY OF THE INVENTION

An example apparatus for allowing operation of equipment by an authorized operator comprises a biometric scanner receiving a biometric input from an authorized operator, and transmitting an authorization signal as long as the biometric input is received from the authorized operator. The apparatus further includes a base station that allows the equipment to operate substantially only while the base station receives the authorization signal from the biometric scanner, and that prevents the equipment from operating shortly after the authorization signal is no longer received from the biometric scanner. A biometric scanner may be a device having one or more biometric sensors, such as a fingerprint reader, retinal sensor, and the like. In some examples, the biometric scanner is a portable device that transmits an authorization signal to a base station. In other examples, a portable device need not include a biometric sensor.

Examples of the present invention allow an operator to monitor operational parameters of equipment, and to provide authorization for using the equipment, while allowing the operator to move around in the vicinity of the equipment.

A timing delay between the end of the authorization signal and the prevention of equipment operation can be introduced according to the application. In fueling applications, the equipment control system may prevent the fueling equipment from operating within ten seconds or less, such as within five seconds, of the authorization signal being no longer received from the biometric scanner. In other applications, the timing delay may be longer, allowing an operator to provide biometric input at intervals. The intervals may correspond to typical required intervals between deadman switch operations.

The authorization signal may be a wireless signal, allowing the biometric scanner to be a portable device transmitting a wireless signal to the equipment control system. The biometric scanner may include a fingerprint reader or other biometric sensor. The biometric scanner further may further include a memory, the biometric scanner identifying the biometric input as being from the authorized operator by comparing the biometric input with stored biometric data in the memory.

Examples of the present invention can be used with, or replace, deadman switch based systems. For example, a signal can be provided to actuate a deadman switch as long as a biometric input is provided to the biometric scanner. Examples of the present invention include fueling systems, such as airport fueling systems where actuation of a deadman switch is required to operate the fueling system.

A process for allowing operation of equipment by an authorized operator comprises receiving a biometric input from an operator, determining if the biometric input is from the authorized operator, transmitting an authorization signal while the biometric input is provided by the authorized operator, operating the equipment only while the authorization signal is received by an equipment control system, and disabling the equipment shortly after the authorization signal is no longer received by the equipment control system. The process may be a fueling process at an airport, and disabling the equipment can occurs within ten seconds or less, such as within five seconds, of the authorization signal being no longer received by the equipment control system.

DETAILED DESCRIPTION OF THE INVENTION

Figure 1:
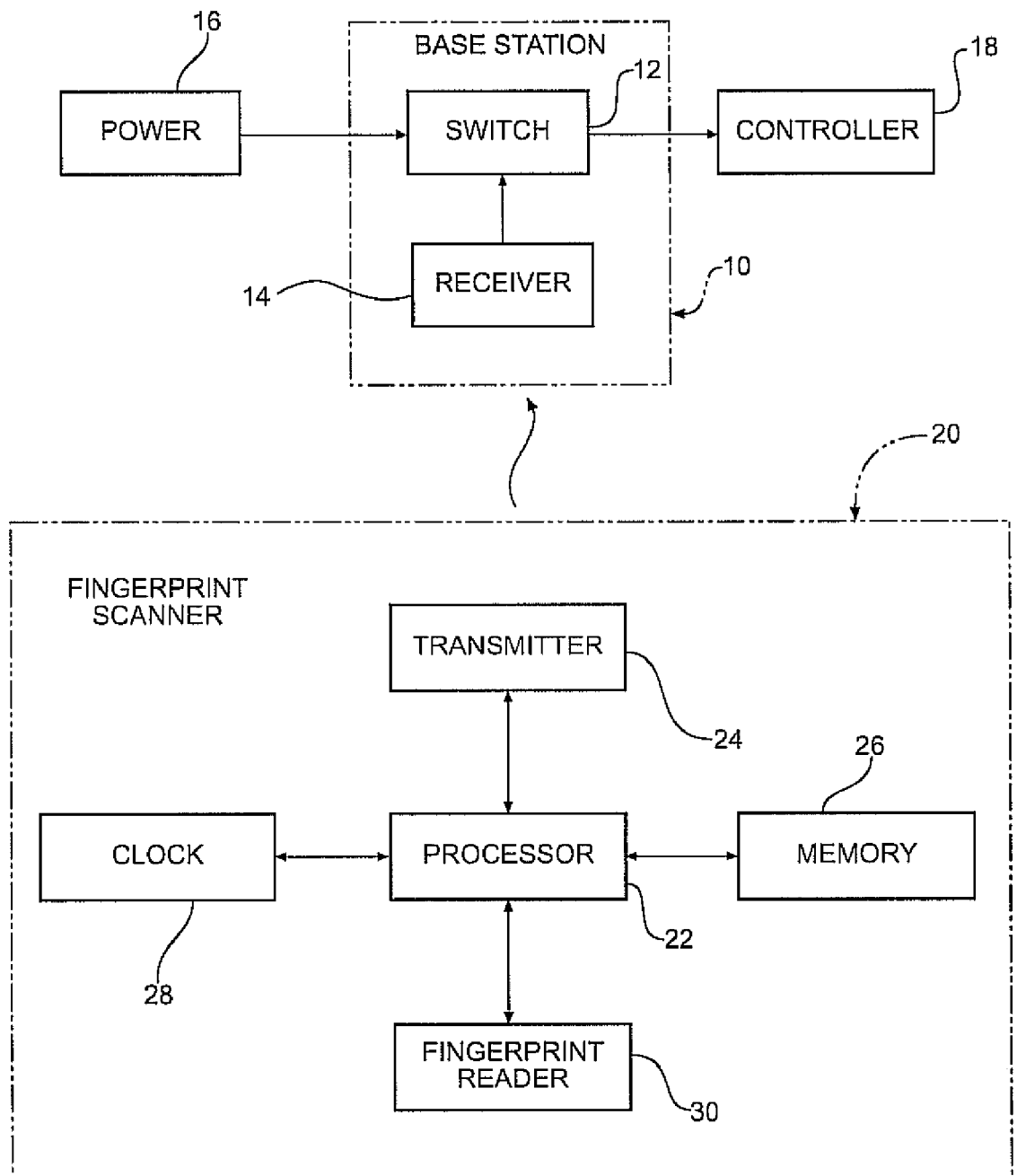
FIG. 1 is a schematic of a base station providing a signal to an equipment controller, the base station receiving a signal from a biometric scanner.

Examples of the present invention include a display unit having a cradle to receive a biometric scanner. In a representative example, the display unit includes a housing, a cradle for the biometric scanner in the form of a recess in the housing adapted to receive the biometric scanner, an electrical interface within the recess allowing electrical communication between the biometric scanner and the display unit, and a display, for example a liquid crystal display (LCD), light emitting display, or other electronic display. The display may be used to show operational parameters, transmission parameters such as transmitted or received signal strength, internal battery status, or other data. Operational parameters may include fuel flow data in gallons or liters (for fueling operations, such as fuel delivered and/or remaining to be delivered), operational duration, time to completion, and the like. Operational parameters may displayed numerically, as a fraction of a total (such as percentage complete), graphically (for example, as a bar chart), or in any manner or combination of approaches desired. The displayed information may be shown in any desired form or combination, such as alphanumerically, as graphical data, and the like. The display unit may include an audible alert, for example sounded near completion of an operation, or at the start of a difficult or dangerous component portion of an operation.

A biometric scanner may be configured so as to dock with a display unit using a cradle. For example, a biometric scanner may include a biometric input (for example, a fingerprint scanner), and a visual indicator (such as red, yellow, and green lights) to indicate authentication. For example, a yellow light may be used to indicate that the fingerprint should be rescanned and/or the input device cleaned before rescanning, and a green light used to indicate that a user has been identified and an authorization signal can be transmitted, or is being transmitted. The authorization signal may be transmitted automatically. A red light may be used to indicate that the fingerprint is not that of an authorized user.

An example apparatus for equipment control allows operation of the equipment only while an authorized operator provides a biometric input to the control system. The control system can include a portable biometric scanner in the possession of the operator. Examples of the present invention include an apparatus that provides identification of authorized persons from a biometric input, and which prevents use of equipment if the operator is not identified as an authorized operator.

A biometric scanner can be used to allow operation of the controlled equipment. The biometric scanner may include a fingerprint reader and/or other biometric sensor. In an example approach, an operator places a finger on the fingerprint reader, and the fingerprint reader reads the fingerprint of the operator and compares this input fingerprint with fingerprints of authorized operators. Authorized fingerprints can be stored in a memory of the biometric scanner. Fingerprints can be deleted from the memory if, for example, the corresponding person is no longer an authorized operator. For example, fingerprints of those that have left the job, or have otherwise lost authorization, can be deleted. Hence, if an equipment operator is fired or leaves the job without notice, unauthorized use by the person can prevented, hence possibly preventing damage to the equipment.

Hence, an improved method for preventing the unauthorized use of equipment by an unauthorized operator includes providing a biometric scanner to an authorized operator, detecting whether the authorized operator is in possession of the scanner by receiving a biometric input from the operator, and only allowing the performance of an operation if the biometric scanner is in possession of the authorized operator.

In the field of airplane refueling, after placing the nozzle of a fuel pump into the adaptor of an aircraft, regulations require that an operator actuate a handheld deadman switch in order to start pumping fuel into the aircraft. In this example, the controlled equipment is an aircraft fueling system. Hazards, such as over-fueling or under-fueling due to operation of equipment by an unauthorized person, can be avoided by only allowing the fueling system to operate if the operator provides a recognized biometric input.

An example apparatus according to the present invention includes a hand-held biometric scanner which transmits an authorization signal to a base station only as long as an authorized operator provides a recognized biometric input to the biometric scanner. The base station allows operation of the controlled equipment, for example by causing actuation of a deadman switch, only as long as the authorization signal is received from the scanner. Hence, operation of the controlled equipment may no longer be possible if any of the following occur: the scanner is handed to an unauthorized person; the scanner is no longer able to transmit the authorization signal to the base station (for example, the authorization signal may be a wireless signal, and the scanner might be out of range of wireless transmission to the base station); or the authorized person no longer provides the biometric input (for example, taking a finger off a fingerprint reader).

For example, if the biometric scanner includes a fingerprint reader, the fuel pumping system is operable only as long as an authorized fueling operator has a finger in contact with the fingerprint reader. This safety feature ensures the presence of the operator until the fueling operation is complete. Fingerprint authentication (or other approach to biometric authorization) can therefore used in an improved aircraft fueling method, or in other equipment operation.

The biometric scanner in the possession of the operator may have a wireless communication to the fueling system. In other examples, the scanner may be built in to a base station, deadman switch, or other equipment control apparatus. In other examples, the base station and controller may be integrated into a single device, or the equipment may include the function of the base station, for example having a radio receiver requiring an authorization signal before the equipment can operate. The base station may receive authorization signals from one or more biometric scanners, and may have alternative ways of providing an authorization signal, such as keying in an identification code and holding down a switch.

FIG. 1 shows a schematic of an example system according to an example of the invention. The system includes a base station 10 which comprises a switch circuit 12 and receiver 14. The switch receives electrical power from a power source 16 and when energized provides an electrical signal to equipment controller 18. The system also includes a biometric scanner 20, which comprises a processor 22, transmitter 24, memory 26, clock 28, and fingerprint reader 30.

An operator is in possession of the biometric scanner 20 and places a finger on fingerprint reader 30. The presence of the finger is detected, and the fingerprint is read and compared with stared fingerprint data in memory 26. If a match is made, the person is identified as an authorized operator of the system. The transmitter 24 then transmits an authorization signal to receiver 14 within the base station 10. When the receiver 14 receives the authorization signal, the switch 12 is energized, sending an electrical signal to the equipment controller. Equipment controlled by the controller operates, or can be operated, while the authorization signal is transmitted by the scanner.

The switch circuit 12 operates to send an electrical signal to the equipment controller during times when the receiver 14 receives the authorization signal from transmitter 24. If the person removes their finger from the fingerprint reader 30, the authorization signal is terminated, and the switch 12 turns off, disabling any equipment controlled by the controller 18.

In this example, the base station 10 and equipment controller 18 (which may be a deadman switch) form an equipment control system that allows equipment operation so long as an authorization signal is received from the biometric scanner.

There may be a slight time delay between removing a finger from the fingerprint reader and turning off of the switch, so as to allow continuous operation of the equipment even if a finger is briefly removed from the fingerprint reader. The time delay between removing a finger from the reader 30, and turning off of any equipment can be fairly short, for example less than ten seconds. In aircraft refueling application, the time delay can be less than five seconds, such as approximately two seconds or less. The time delay can be provided by a suitable electrical circuit in the scanner, the base station, or the controller, for example using an electronic timer or software implementation.

The biometric scanner 20 is preferably a portable device, such as a portable device configured as a key fob, handheld device, or other portable device. The biometric scanner can be a portable electronic device having additional functionality, such as a cell-phone, PDA (personal digital assistant), vehicle remote keyless entry system (in which case, the biometric scanner may also provide a vehicle security feature by only allowing an authorized operator to open and/or use a vehicle), and the like.

The biometric scanner may be built in to a wearable object, for example having additional functionality, such as a wristband, glove (a fingerprint reader may be on the inside of the glove), eyeglass or safety goggles frame (which may include an iris scanner), hat (which may include a face recognition feature using a cap-mounted camera), footwear (which may include a pressure sensor or toe scanner), or other object.

The biometric scanner may also operate as an identity card, for example having an image of the authorized operator on the housing of the biometric scanner. The authorization signal from the biometric scanner may also be transmitted to other devices, such as restricted access entryways (gates, doors, and the like), allowing the person to pass through. The biometric scanner may also transmit a position signal when the biometric input is provided, allowing the position of the operator to be monitored.

The communications link between the transmitter 24 and the receiver 14 may be a wireless link, such as a radio link, so that the authorization signal is a radio signal. The authorization signal may also be provided by a permanent cable link (such as an electric cable or a fiber optic cable), optical signal (such as a laser), IR, or ultrasound signal. The authorization signal may be modulated. The signal modulation may, for example, convey an authorization code if an authorized operator is identified.

Figure 2:
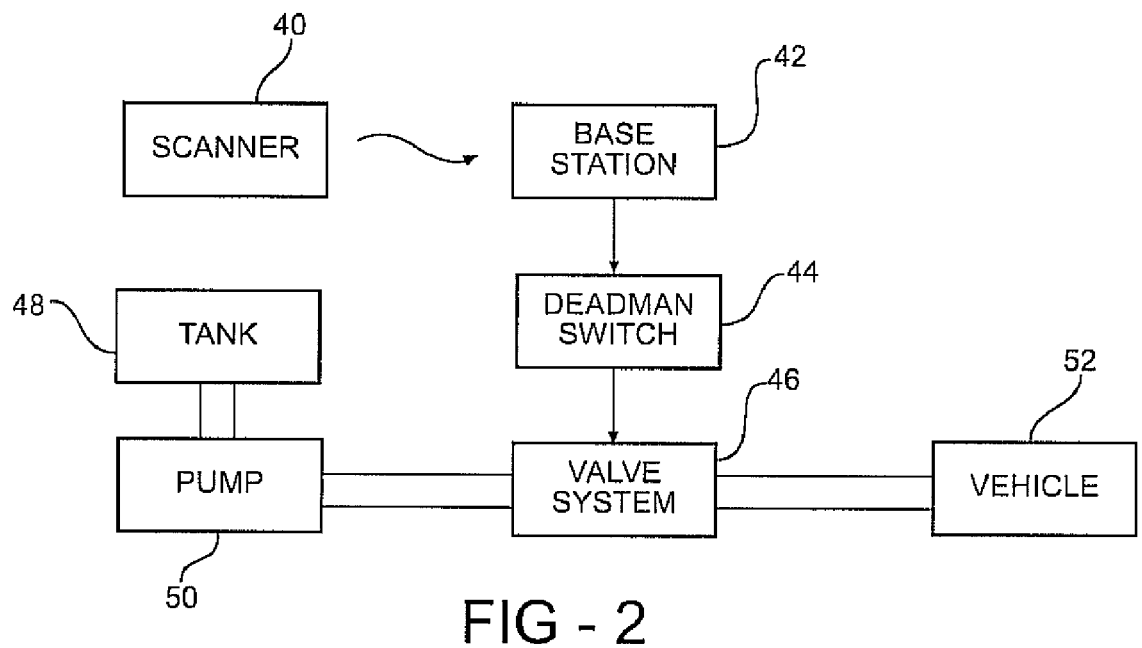
FIG. 2 is a schematic of an apparatus according to the present invention used in a fueling system.

FIG. 2 illustrates another configuration of an equipment control system, comprising biometric scanner 40, base station 42, deadman switch 44, valve system 46, fuel storage tank 48, pump 50, and vehicle 52 receiving fuel.

The biometric scanner 40 provides a wireless signal to the base station 42 when an authorized operator gives a recognized biometric input to the biometric scanner. Actuation of the deadman switch 44 is necessary to open valves within the valve system 46, allowing fuel to be pumped from the fuel storage tank 48 to the vehicle 52. The deadman switch actuates, enabling the valve system to allow fuel to pass from the fuel storage tank to the vehicle. For example, when the deadman switch receives an electrical signal from the base station, this may cause a valve or passage within the valve system to open. The electrical signal to the deadman valve is only provided when an authorization signal is received by the base station from the biometric scanner. Fuel can then pumped by the pump from the storage tank to the vehicle. The fuel storage tank may be a fuel tanker, and the vehicle may be an airplane.

In this example, equipment control includes actuation of the deadman switch. For example the deadman switch may be located within a fuel pump handle. An electrical deadman switch is actuated on receipt of a suitable electrical signal from the base station. For aircraft fueling, typically a 14 V electrical signal is necessary to actuate the deadman switch.

If the deadman switch is mechanical (such as a pneumatic deadman switch) an electrically powered actuator may be provided, configured to actuate the deadman switch on receiving an electrical signal from the base station. In this example, the base station provides the electrical signal necessary for operation of the fuel pump. The base station may also include an electrically powered actuator, and actuate the deadman switch through a mechanical, rather than electrical, coupling. In other examples, the base station and deadman switch can be integrated into a single equipment controller, which itself may be part of the equipment to be controlled.

Figure 3:
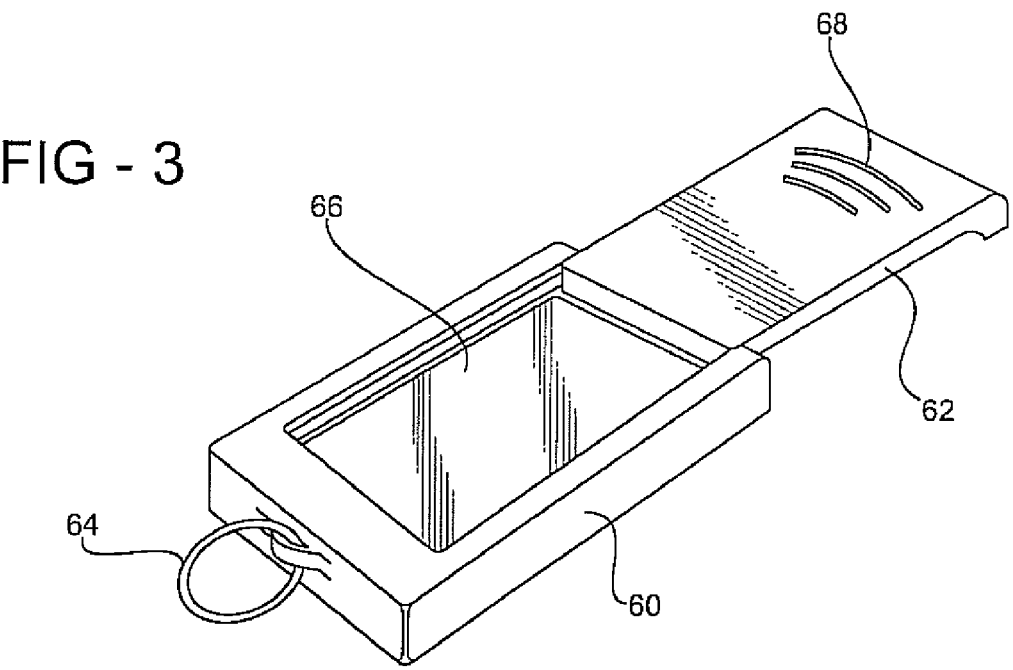
FIG. 3 shows an example of a biometric scanner which can be used in examples of the present invention.

FIG. 3 shows a view of a biometric scanner which can be used in examples of the present invention. The biometric scanner comprises housing 60, slidable cover 62 with an optional gripping surface 68, attachment ring 64, and fingerprint reader 66. An operator slides back the slidable cover and places a finger on the fingerprint reader 66. If the fingerprint is recognized as being that of an authorized operator, the biometric scanner transmits an authorization signal, in this case a wireless signal, to the base station. When not in use, the slidable cover can be pushed back to protect the fingerprint reader. A commercially available device manufactured by MicroLatch™ can be used for fingerprint identification, and adapted for use with examples of the present invention.

Figure 4:
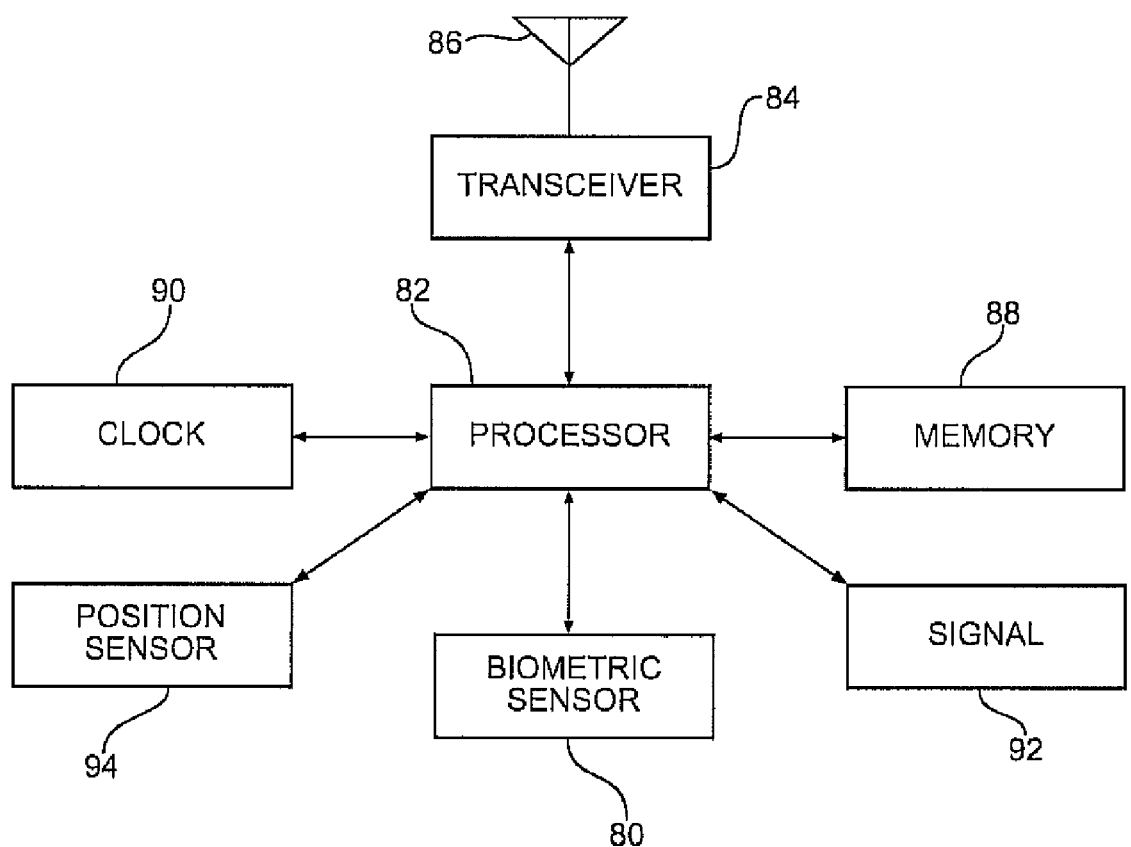
FIG. 4 is a schematic of an example biometric scanner according to the present invention.

FIG. 4 shows a schematic diagram for an example biometric scanner. The scanner comprises biometric sensor 80, processor 82, transceiver 84, antenna 86, memory 88, clock 90, signal 92, and position sensor 94.

The biometric sensor 80 may be a fingerprint reader, iris scanner, or other sensor providing an electrical signal correlated with a unique personal identifier. The biometric scanner may comprise one or more biometric sensors selected from: fingerprint reader (as used here, the term includes palm reader, toe-print reader, or other reader detecting skin topographies such as fingerprints); face recognition (the sensor may be an imaging sensor coupled to a face recognition software system); limb configuration sensor (for example, characterizing relative finger lengths, bone structure, vein structure and/or other configuration of hand, arm, foot, legs, or other anatomical feature); eye scanner (such as a retinal scanner or iris scanner); odor detector (including respiration component sensors); voice recognition sensor; gait sensor or other motion sensor (a characteristic motion may be sensed as a biometric input); DNA sequencer (for example receiving DNA as a biometric input); electromagnetic receiver (for example, receiving brainwaves, transmissions from body-implanted transmitters, or transponder system characterizing the transient response of a person to an electromagnetic pulse); or other biometric sensor.

The biometric sensor may also determine that the biometric input is being provided by a living person, for example by measuring an associated pulse or other physiological indication of life.

The signal 92 may be a signal activated when an authorized operator is identified. The signal may comprise an indicator lamp (such as a light-emitting diode) energized when an authorized operator is identified, a visual representation on a display, illumination of the biometric sensor, haptic signal, or other operator interface.

The position sensor 94, which is optional, may be a GPS sensor, cellphone-based triangulation device, or other device that provides an absolute position or a relative position relative to the base station.

If a biometric input corresponding to an authorized use is recognized, an authorization signal is transmitted using the transceiver and antenna. The biometric scanner may additionally receive signals from the base station. For example, the device may be activated after receiving an activation signal from the base station.

Figures 5, 6:
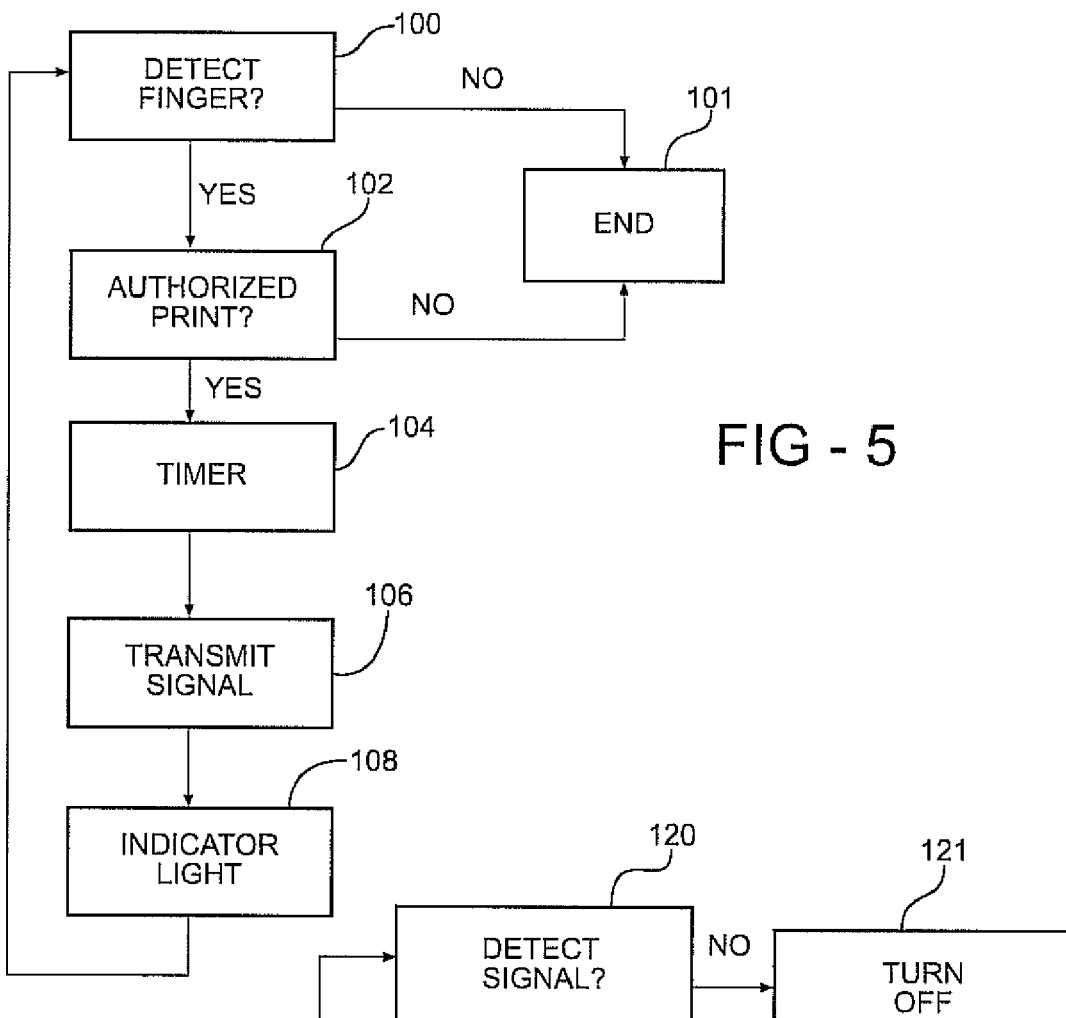
FIG. 5 is a flowchart showing a possible operation of a biometric scanner.
FIG. 6 is a flowchart showing a possible method of operation for a base station.

FIG. 5 shows a possible method of operation of a biometric scanner. The method of operation may be provided by a software program executed by a processor within the biometric scanner. In the example below, the biometric input is the placement of a portion of a finger on the fingerprint reader, a fingerprint reader then reading input fingerprint data from the finger.

Box 100 corresponds to detecting a finger on the fingerprint reader. If no finger is detected, the present process comes to an end. If a finger is detected, corresponding to the "yes" option on the figure, the fingerprint can then compared with authorized fingerprints.

Box 102 corresponds to determining if the fingerprint is that of an authorized operator. The input fingerprint may be compared, for example, to authorized fingerprints stored in a memory of the biometric scanner. Authorized fingerprints may also be stored at a remote location, such as in a computer database accessible by the scanner, or on the base station. Fingerprints may be reduced to numerical data to reduce data storage requirements, as is known in the art. Certain distances between typical fingerprint features may be measured, and converted into numerical parameters. If the fingerprint is not that of an authorized operator, corresponding to "no" on FIG. 5, the process comes to an end.

Box 104 corresponds to an optional timing delay. For example, if an authorized operator is detected, a reset pulse can be sent to a timer. If no reset pulse is received within a timing period, the timer signal terminates. If the timer has a two second timing period, the timer signal terminates two seconds after the finger is removed. This allows continuous operation of controlled equipment with momentary removal of the finger from the fingerprint reader. The timing delay is optional, and analogous circuitry may be provided in the base station Box 106 corresponds to transmitting an authorization signal to the base station. The authorization signal is transmitted as long as a fingerprint of an authorized operator is detected (subject to any timing modifications as described above in relation to box 104). The transmission is started if the authorized operator is detected for the first time, or maintained if the fingerprint was previously detected.

Box 108 is optional, and corresponds to providing operator feedback, such as an indicator light, to the operator showing if authorized status is detected. Authorization status possibilities may include authorized, not authorized, or input required (for example input or re-input of a biometric signature such as a fingerprint).

If a fingerprint is detected, but cannot be identified as an authorized fingerprint, the operator may be prompted to clean the finger, reposition the finger, or otherwise improve the characteristics of the input fingerprint.

The process cycles until either no authorized fingerprint is detected, or the fingerprint detected is not recognized as that of an authorized operator, in which case the process comes to an end indicated by box 101. In practice the fingerprint reader will be sampled at intervals, such as every second, to determine if a finger is present. The fingerprint reader may send a signal starting this process if a finger is detected. A finger may be detected by the presence of an input fingerprint, or using, for example, a capacitive sensor responsive to touch pressure or electrostatic signals from the finger.

This method may be used with other types of biometric indicator, such as iris scans and the like. The indicator light 108 and timing delay 104 are optional and can be omitted. Similarly, the authorization step may in some examples be omitted. It may be sufficient that any person is present for transmission of a signal in box 104.

In other examples, the biometric scanner transmits biometric data to the base station, and the base station identifies the biometric data as being from an authorized operator. In this example, the authorization signal transmitted by the biometric scanner includes biometric data. The authorization signal is only transmitted while an authorized operator provides a biometric input, as if a non-authorized person provides the biometric input the transmitted signal cannot contain the necessary biometric data, and hence cannot act as an authorization signal.

FIG. 6 shows a schematic of a possible method of operation of a base station.

Box 120 corresponds to detecting a signal from the biometric scanner. If no signal is detected, a controller in communication with the base station is turned off. The base station may operate directly as the equipment controller, and may be part of the equipment.

Box 122 is optional, and corresponds to checking that additional required parameters are within acceptable ranges when an authorization signal is detected. Additional parameters may include operating temperature, location of the operator, provision of additional authorization codes, provision of billing or payment information, fuel pressure (for refueling applications), time, other ambient conditions, or other parameters that are required to be within a certain range for the operation to proceed.

Box 124 corresponds to an optional timing delay, such as discussed above in relation to FIG. 5.

Box 126 corresponds to turning or keeping on an equipment controller, or the equipment itself. This may comprise provision of power to equipment, or an electrical signal to a deadman switch, or other switching system.

Box 121 is reached if no authorization signal is received, or if additional parameters are outside of acceptable limits, and corresponds to deactivating an equipment controller. This may correspond to shutting off the fuel supply to an airplane, turning off equipment, or otherwise stopping an operation that requires the presence of an authorized person.

The base station may provide an operation signal while the authorization signal is received from the biometric scanner. In other examples, the base station may provide a turn-on signal when the authorization signal is initially received, and a turn-off signal when the authorization signal is no longer received, or has not been received for a predetermined timing delay.

Examples of the present invention include improved aircraft fueling systems. In an illustrative example, an operator is provided with a biometric scanner including a wireless transmitter, which transmits an authorization signal to a base station when a biometric input is received. The base station receives electrical power from a vehicle battery, and if an authorization signal is received from the biometric scanner, the base station provides an electrical signal to the handle input of the deadman switch of a fuel handle. In this example, the base station includes a wireless receiver, possibly a wireless transceiver, and receives typically twelve volts from a vehicle battery as an input, and provides the fourteen volts output that is typically required to actuate a deadman switch, the electrical signal being directed to a handle input inside the refueling vehicle.

The biometric scanner can be a fingerprint reader in a portable device, the biometric scanner also including a dedicated power supply in the form of one or more batteries, and a wireless transmitter to transmit the authorization code. The biometric scanner can be in wireless communication with the base station. The base station can be located in the cabin of a refueling vehicle where it receives an input voltage from the vehicle battery. When an authorized person puts a finger on the fingerprint reader, the scanner authenticates the authorization of the operator, sends a authorization signal to the base station, and sends an output voltage of fourteen volts to the deadman handle input in the vehicle cabin. This example is particularly useful in an improved aircraft refueling system. Fuel flow can then be provided from the refueling vehicle to the aircraft. The fourteen volts output is provided as long as a finger of an authorized operator is on the fingerprint reader. As soon as the finger is removed from the scanner, the output voltage falls to zero, the deadman switch in the fueling handle no longer receives the required fourteen volts, and the fuel flow to the aircraft is shut off.

In examples of the present invention, the biometric scanner may have low power (less than one watt, to avoid sparking hazards), a working distance of less than 50 feet, may have multiple frequencies for multiple authorized operators (such as fuel vehicle operators) such as a frequency of 300 MHz with 256 identifications. The biometric scanner can be handheld, and may use a rechargeable or long-life battery as a dedicated power supply. Different wireless modulation patterns can also be used to differentiate different biometric scanners.

In fueling applications, the biometric scanner should not generate any spark or similar combustion danger. The fueling process can have a shutoff time of less than approximately two seconds after the recognized biometric input terminates (for example, a finger removed from a fingerprint reader). A biometric scanner can provide a reasonably quick authentication of the operator identity, allowing a reliable authorization status to be determined, and can operate under both low and high temperatures typically found in an outdoor environment. If necessary, the surface of a fingerprint reader may be heated to remove condensation or ice.

In examples of the present invention the biometric scanner may be the dimensions of a garage door opener, and may be similarly clipped to a sun visor of a vehicle. The biometric scanner provides a wireless or authorization signal when a biometric input is received from an authorized operator, for example when the finger of an authorized operator is on the fingerprint reader, and no longer provides the authorization signal after the finger is removed.

A suitable biometric scanner having a fingerprint reader may be adapted from commercially available designs, such as the fingerprint scanner of MicroLatch™, or as described in U.S. Patent Application Publication No. 2003/0032407 to Mages. The biometric scanner may have an internal antenna, external antenna protruding from its housing, or may connect to a longer antenna, for example in a vehicle.

Airport fueling regulations generally require that an aircraft fueling system has a deadman switch. Examples of the present invention go beyond the safety requirements of such regulations by allowing authentication of the operator.

Furthermore, in examples of the present invention, the biometric scanner is portable, enhancing operator mobility to improve process monitoring. In airplane fueling applications, the operator can move around, for example, to monitor the panel of fueling equipment, aircraft control panel during pressure fueling, and also can monitor fill ports during over-wing fueling. Hence, the operator need not be restricted to any fixed mechanical device.

In an example of the present invention, the operator is not required to stand depressing a mechanical switch as in certain conventional systems. Examples of the present invention provide all of the benefits of a deadman fueling system, while adding authentication of the operator identity, and allowing the operator mobility to investigate any potential safety hazards. The biometric input may not require any effort by the operator. For example, the operator may just rest a palm or finger onto a fingerprint reader. In other examples, the operator stands or sits where other biometric input can be collected, for example by an imaging sensor (for face recognition), or iris or retinal scanner.

Biometric scanners can be built in to vehicles or other equipment. For example, a steering wheel or other surface may include a fingerprint reader. Image sensors may be built into the vehicle cabin.

The system can be used with any kind of fuel control valve, such as a hydrant pit valve, at the tank outlet on a tank vehicle, on a separate valve of the tank vehicle, and on a hose nozzle of an over-wing servicing system.

A fingerprint authentication requirement (or other biometric input requirement) also makes it more difficult to defeat the deadman switch feature. Conventional mechanical controls or interlocks can be jammed open using pieces of metal or taped open or otherwise permanently opened without the requirement of an operator being present. This can cause a very serious safety hazard. Also, conventional deadman switches can be successfully operated by any person, whatever their relationship to the owner of the equipment. However, with the example improved apparatus described herein, a biometric scanner can accurately detect the presence of an authorized operator.

The biometric scanner may also have a pulse sensor, or similar, so that, for example, a fingerprint cannot be transferred to the surface of the fingerprint reader using an adhesive tape, silicone mold, dismembered finger, or similar method.

An example biometric scanner may be in the form of a wireless transmitting portable device having a fingerprint reader, the scanner possibly having the size of a key fob. For example, the wireless transmission of a biometric scanner may operate at approximately 433.92 MHz, can be SAW resonator locked, use AM ASK transmission modulation, Keeloq™ code hopping technology, and have a 50 foot maximum range. All parameters may be variable according to the desired application and performance.

An example fingerprint reader which can be used in a biometric scanner is a Touchip™ fingerprint reader, which typically allows up to one million reads and withstands up to 15 kV air discharge onto the sensor surface. This fingerprint reader has a false acceptance rate of typically 0.01 percent. Other fingerprint readers can be used.

The biometric scanner may include one or more biometric sensors to determine if an operator is an authorized operator that is permitted to operate equipment. Biometric sensors may scan or otherwise analyze a fingerprint, toe print, exhalation components, heartbeat (including EKG signal), iris patterns, operator weight (for example standing on a sensor, the sensor detecting natural fluctuations of a standing person due to muscular contractions), electromagnetic field detection including brain wave detection, and the like.

Communication between the biometric scanner and the base station may take the form of radio frequency electromagnetic radiation, optical, IR, or other electromagnetic radiation. The communication may also be non-wireless, for example an electrical cable or fiber optic cable. The radio communication may be AM or FM modulated; similarly other electromagnetic links may be modulated, for example an infrared link may be modulated.

Examples of the other applications include fueling of vehicles other than aircraft, recognition of an operator and automatic debit for payment, and the like. For example, an automobile fueling system may comprise a fuel pump that dispenses fuel on receipt of an identifying code provided by a biometric scanner. The person associated with the identifying code can then be automatically billed for the fuel purchased, in a similar manner to use of a bank debit card.

A biometric scanner, such as a scanner including a fingerprint reader, may be included into an improved gas pump handle, for example to only allow the gas pump to be used by an authorized person, or for automatic identification and billing of the person using the gas pump. The pump may be mechanically latched on as long as a finger is placed on a fingerprint reader. The fingerprint reader may be part of the pump handle, otherwise part of the pump assembly, or a portable unit.

In examples of the present invention, repetitive strain injuries caused by the need to physically hold down a lever of a deadman switch or other interlock can be avoided. In examples of the present invention a person only need contact a finger onto a fingerprint reader. The fingerprint reader may be adhered to a person's finger, or the biometric scanner may be mechanically attached to a person's hand, for example using a strap. In other examples, a person need only stand where their face can be recognized by a face recognition system.

Multiple biometric scanners may be used, for example a first scanner for an authorized operator, and a second scanner for a fuel purchaser, airplane pilot, or other vehicle operator. Security can be increased by requiring multiple authorized biometric inputs.

The biometric scanner may also include a position sensor, for example, which provides information on the relative proximity of the operator to the base station. This can be used in an improved safety interlock system, in which an operator has to be a certain distance away from a dangerous piece of equipment. Also, it can be used to ensure that a person is close enough to a piece of equipment, such as a fuel pump, so that the person may deal with any dangerous situations quickly.

The biometric scanner can be included as part of another portable electrical device, such as a cell phone, vehicle operation device such as an automatic unlocker, PDA (personal digital assistant), or other electronic device that may be conveniently carried by the operator.

Examples of the present invention also prevent an authorized operator from getting a non-authorized person, such as an unskilled colleague, to fill in for them while the authorized operator leaves the proximity of a dangerous process such as airplane refueling, or operation of equipment.

In other examples, it may only be necessary for a person (not any particular person) to be present. The biometric scanner may provide an authorization code so long as it receives a biometric input from a person, but need not verify that the received biometric input is from an authorized person. For example, an input fingerprint can be identified as being provided by a living human, without identification.

Stored biometric data used for identification may be set to expire after a certain time period, such as a week, year, rental period of the equipment, or other predetermined time period. The biometric scanner may include GPS circuitry or other position-determining circuitry, allowing the location of the authorized operator to be tracked. The scanner may transmit a location signal at intervals or continuously, or only when the authorization signal is transmitted.

Display Unit

Some examples of the present invention include a display unit. An example display unit includes a housing and a display on which data can be shown, and may further include one or more of the following features: a wireless receiver for receiving data to be shown on the display, an electrical interface (e.g. for electrical connection to a biometric scanner), a keypad for data entry, a transmitter (or transceiver) for transmission of data, one or more warning lights and/or audible alerts, and/or other features. For fueling application, a display unit can be used in part for displaying fuel delivered. The units for data display may be user-selectable, and the displayed parameter may be a proportion of a predetermined operation (such as a fraction of a fuel delivery volume, such as 0-100%).

Figure 7:
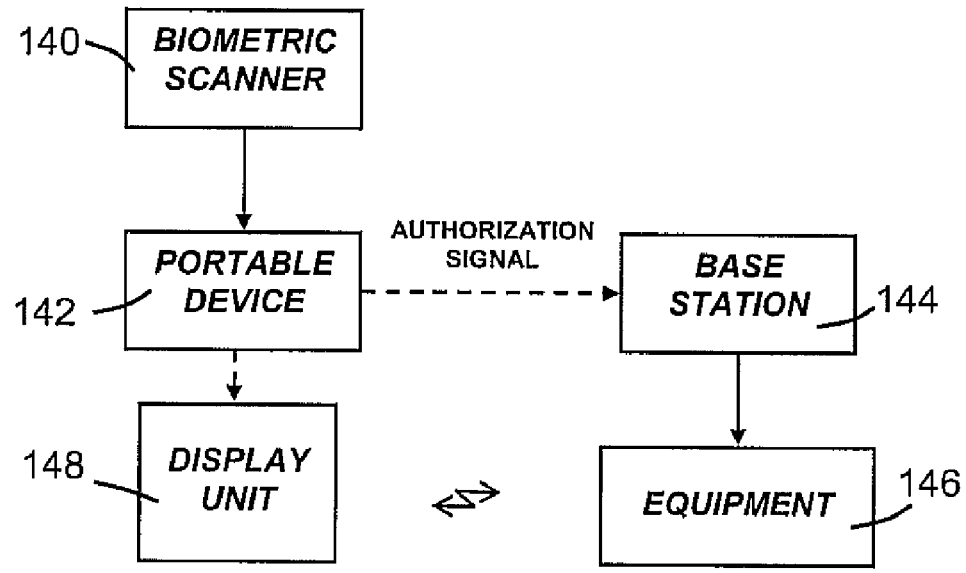
FIGS. 7 and 8A-8C and illustrates example uses of a display unit.

FIG. 7 shows another embodiment of the present invention, comprising biometric scanner 140, portable device 142, base station 144, equipment 146, and display unit 148. In this configuration, an equipment operator provides, for example, a fingerprint to the biometric scanner. The biometric scanner transmits biometric data to the portable device. This may be carried by the equipment operator, and may receive the biometric data through a wireless or wired link. For example, a portable device may be connected to the biometric scanner using a cable or docking port, or another electronic connection. Alternatively, the portable device may include a wireless receiver to receive the biometric data wirelessly. The equipment operator then approaches the base station and an authorization signal is transmitted from the portable device to the base station as indicated by the jagged arrow. In other configurations, a biometric signature is not required, and the portable device transmits an authorization signal based on a non-biometric authorization, such as a receiving a personal identification number (PIN), a device code, or other method of authorization.

The display unit 148 receives operational parameters from the equipment, and optionally the authorization status (such as authorized operator, or non-authorized operator) from the portable device and/or the equipment. The figure does not show a separate equipment controller (such as a deadman switch), though this may be present.

The portable device 142 may further include a liveness sensor, a sensor that detects the proximity of a live person, such as a person holding the portable device. This feature can help prevent the portable device from being, for example, abandoned by an operator so defeating safety interlocks. The liveness sensor may include a pulse detector, or other sensor detecting the presence of a living person. The liveness sensor may be the same as a biometric sensor, for example a fingerprint reader that also detects a pulse.

On receiving an authorization signal, the base station may activate a communications link between the base station and the portable device. The activation of the data link may require proximity of the portable device, and continued operation of the equipment may require the portable device to remain within a certain distance of the base station. Continued operation may require substantially constant transmission of an authorization code, such as a device code or other data, such as biometric liveness indication and/or biometric signature matching. If the activation signal is lost, the base station may switch off operation of the equipment. This switch off may be immediate, or may be within a certain time from the loss of reception of the authorization signal.

Figure 8A:
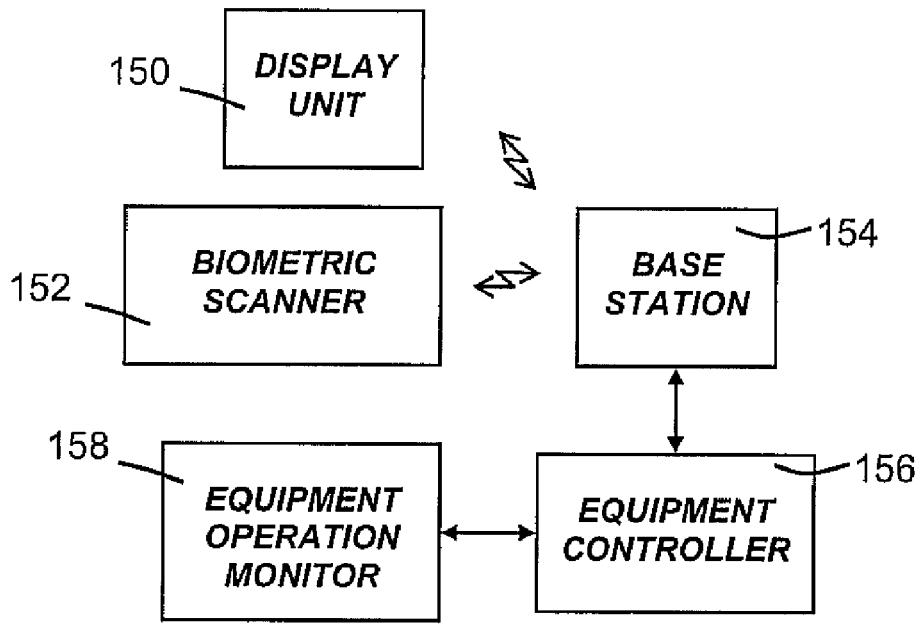

FIG. 8A shows another system example allowing improved safety operation of equipment. The apparatus comprises a display unit 150, biometric scanner 152, base station 154, equipment controller 156, and equipment operation monitor 158. In this example, the base station can receive an authorization signal from the biometric scanner (indicated by the jagged arrow), and the base station provides an electrical signal to the equipment controller after an authorization signal is received, in some examples requiring continued reception of the authorization signal for continued operation of the equipment. The base station may also receive operational parameters relating to the controlled equipment. In this example, the base station may receives operational parameters from an equipment operation monitor, either directly or through the equipment controller, and transmits the operational parameters to the display unit.

In other examples, the operational parameters may be transmitted from the equipment operation monitor to the display unit. In this and other examples, functions of separately labeled elements may be combined. For example, a single component may operate as an equipment operational monitor and equipment controller. Similarly, a single component may operate as an equipment operational monitor, equipment controller, and base station, and communicate with the display unit and/or biometric scanner. In some examples, the biometric scanner may not be used, or another authorization device used such as a smart card, other card, a portable wireless transmitter transmitting an authorization signal without requiring biometric identification, and the like.

Figure 8B:
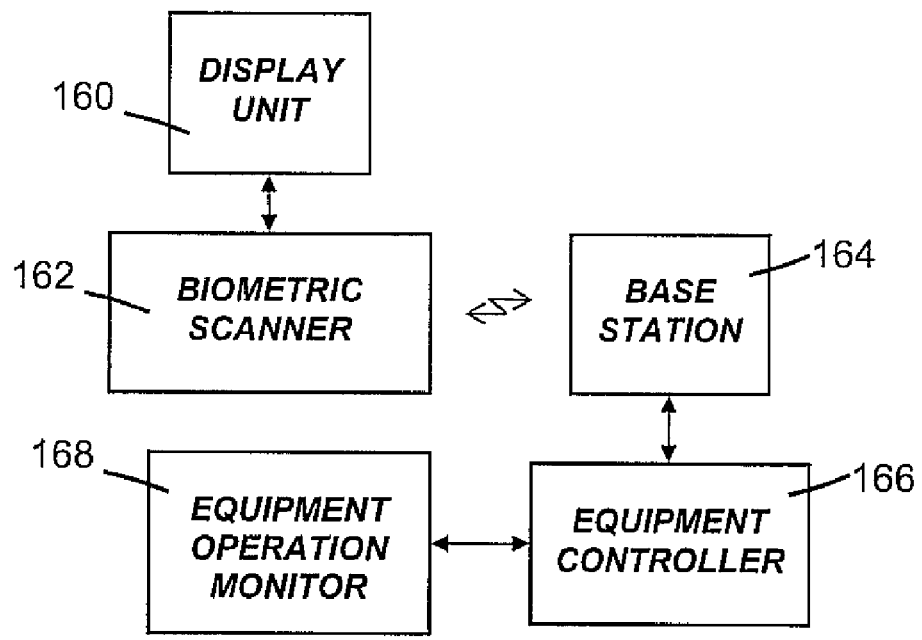

FIG. 8B shows an alternative configuration including a display unit 160, biometric scanner 162, base station 164, equipment controller 166, and equipment operation monitor 168. In this example, the display unit 160 and a biometric scanner 162 are in electrical communication. This may correspond to the biometric scanner being cradled by the display unit. The operational parameters from the equipment operation monitor may be received by the biometric scanner 162 from the base station 164 and communicated to the display unit 160, for example through an electrical interface.

Figure 8C:
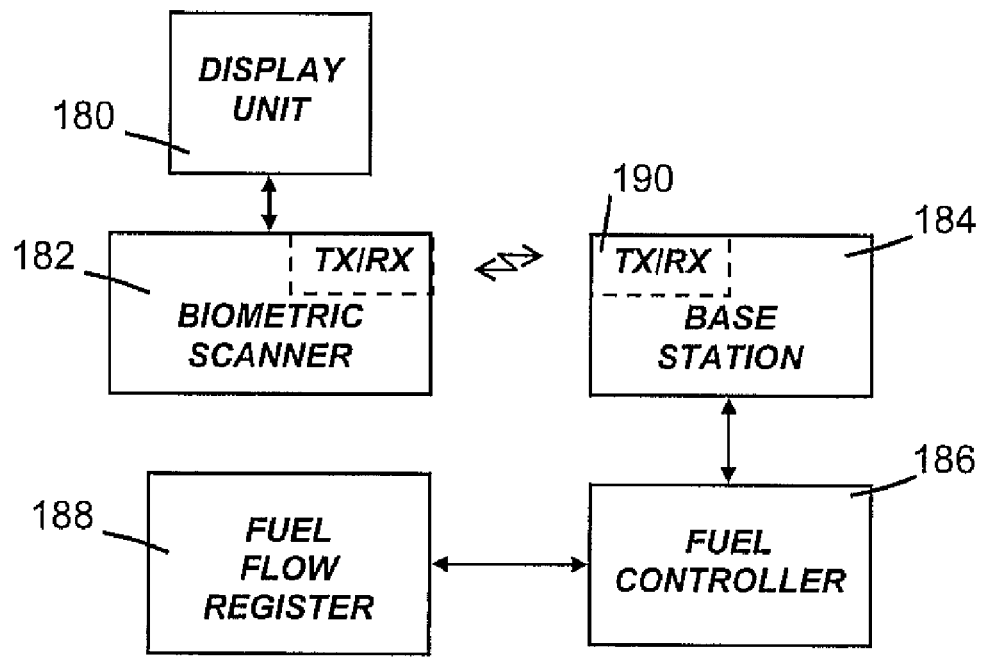

FIG. 8C shows an example related to fueling operations. The figure shows a display unit 180 in communication with a biometric scanner 182, a base station 184, a fuel controller 186, and a fuel flow register 188. The figure shows wireless transceivers (TX/RX), such as transceiver 190, in the base station and the biometric scanner. The fuel flow register provides fuel flow data (e.g. gallons of fuel pumped), which is received by the base station through a communication link with the fuel controller. The fuel controller may include a deadman switch and a fuel valve, as described earlier. The fuel flow register and fuel controller may be a single device. The fuel flow data can be transmitted by the base station to the biometric scanner, and shown on the display unit.

In some examples, a receiver (which may be present as part of a transceiver) may be located in the display unit, and/or the transceiver in the biometric scanner omitted. In some examples, the display unit or the biometric scanner may receive equipment operation data (such as fuel flow data) directly from the equipment operation monitor. For example, an equipment operation monitor such as fuel register may include a transmitter. An equipment operation monitor may transmit equipment operation data to the equipment controller, base station, biometric scanner, display unit, and/or other device, or any combination of one or more of these devices.

Figure 9:
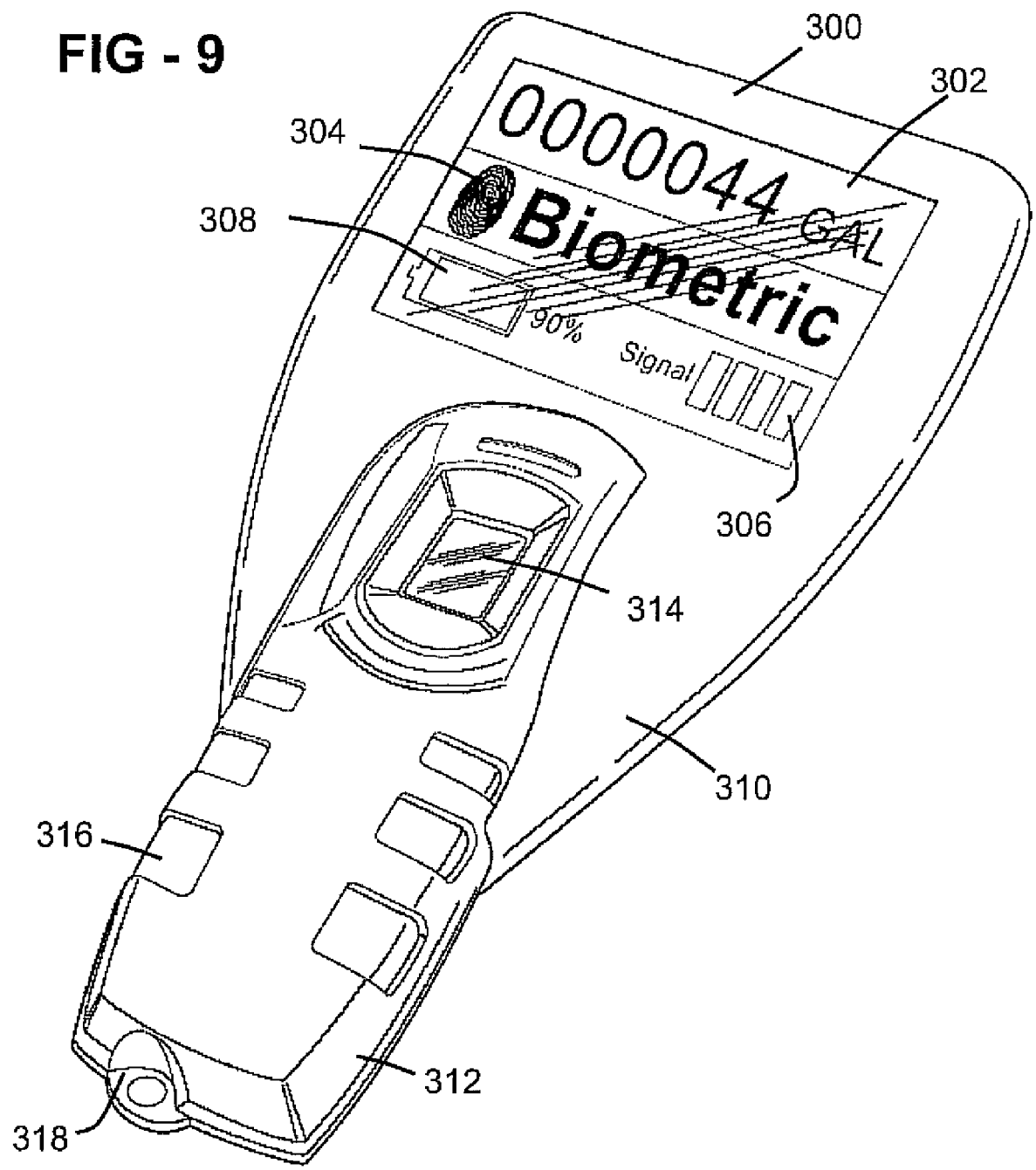
FIGS. 9 and 10 shows a biometric scanner engagement with a display unit.

FIG. 9 shows an example in which a display unit cradles a biometric scanner. The figure shows a display unit 300 having a display 302, in this case a liquid crystal display, showing operational parameters such as fuel flow data. Other displayed parameters include authorization status, in this case biometric signature status 304 (biometric signature accepted or rejected), signal strength 306, and internal battery status 308. The housing 310 provides a supporting cradle for the biometric scanner in the form of a recess in the housing adapted to receive the biometric scanner. The biometric scanner has housing 312, with optional grips 316, and a biometric sensor in the form of a fingerprint sensor 314.

Figure 10:
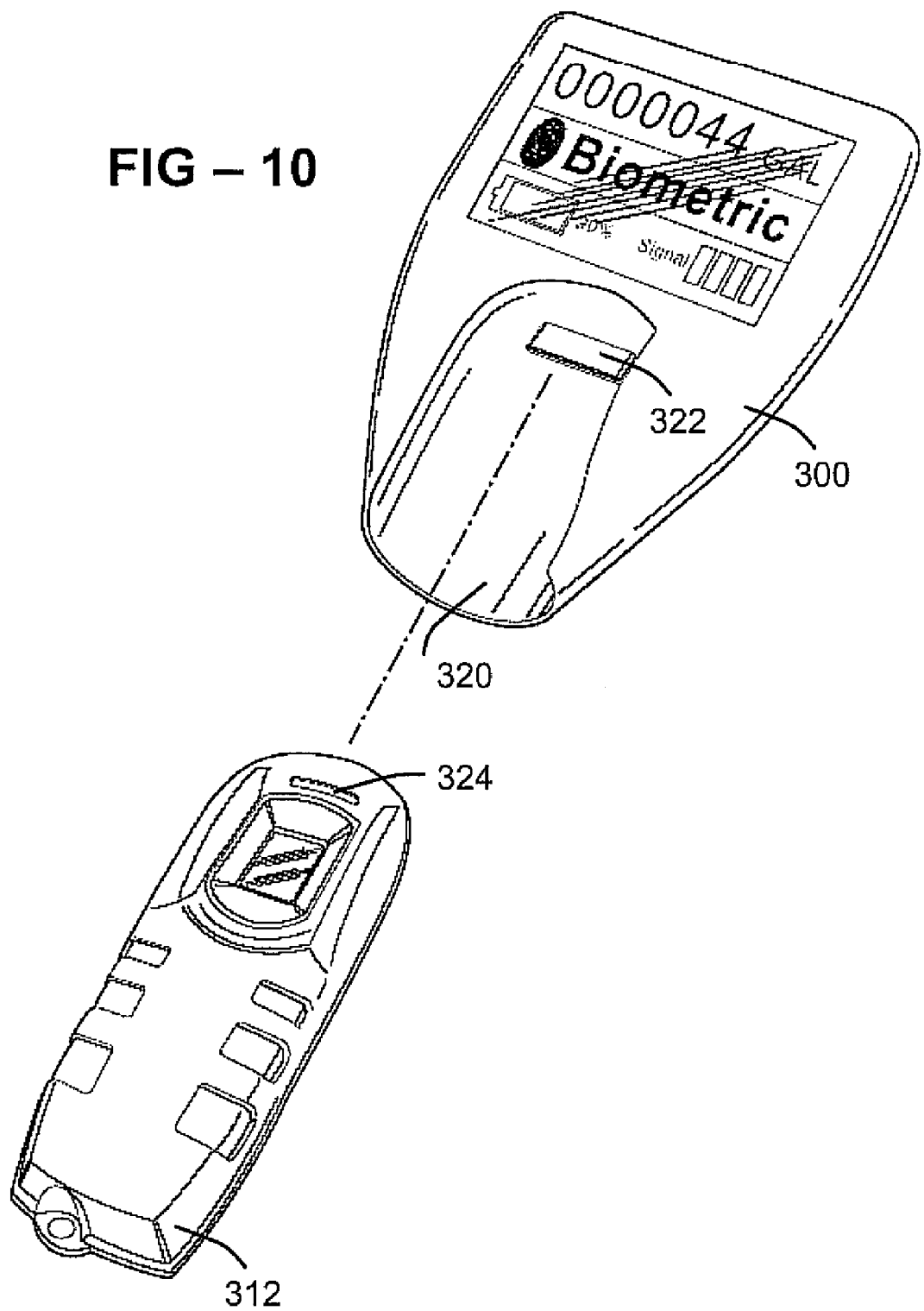

FIG. 10 shows an example display unit, having an electrical interface 322 within the recess 320, allowing electrical communication between the biometric scanner 312 and the display unit 300 when the biometric scanner is docked within the recess. In this example, the biometric scanner has a housing configured to be docked with a recess in the housing of the display unit, so that the display unit acts as a cradle for the biometric scanner.

In this example, the biometric scanner 312 may have a visual indicator at 324 to indicate authorization status. For example, a green light may indicate that a user has been identified and an authorization signal can be transmitted (or is being transmitted), a red light used to indicate that the fingerprint is not that of an authorized user, so that no authorization signal can be transmitted, and a yellow light used to indicate that the fingerprint should be rescanned and/or the input device cleaned before rescanning. An authorization signal may be transmitted automatically once an acceptable biometric input is obtained. The information on display 302 may be shown alphanumerically, as graphical data, or as any other form or combination of visual representation.

In some examples of the present invention, a display unit receives an authorization device (such as a biometric scanner), and can provide a cradle so that the authorization device is in electrical communication with the display unit when the authorization device is in the cradle. In some cases, the display unit and authorization device may be mechanically coupled by urging the authorization device into a recess within the housing of the display unit. The mechanical coupling may be provided by a snap connection, engagement of electrical interfaces (such as a plug an socket), friction, or one or more mechanisms. An advantage of mechanical coupling is that a combination of display device and authorization device may be readily carried by one hand, or suspended around the neck, allowing improved operator flexibility to respond to problems. The display device may provide useful functionality that then need not be included within an authorization device, allowing the authorization device to be made more portable. In some examples, a display unit may be an independent device from the biometric scanner, for example receiving data from the biometric scanner (and/or a base station) using a wireless link. In some configurations, a separate biometric scanner may be omitted, with authorization not being required, or alternatively provided by a non-biometric authorization device. In other examples, the display unit may include a biometric sensor, and include the functions of the biometric scanner or other authorization device into the display unit.

The biometric scanner may be physically small, for example in the form of a card (such as a smart card), and slot into or otherwise engage with the display unit.

Figure 11:
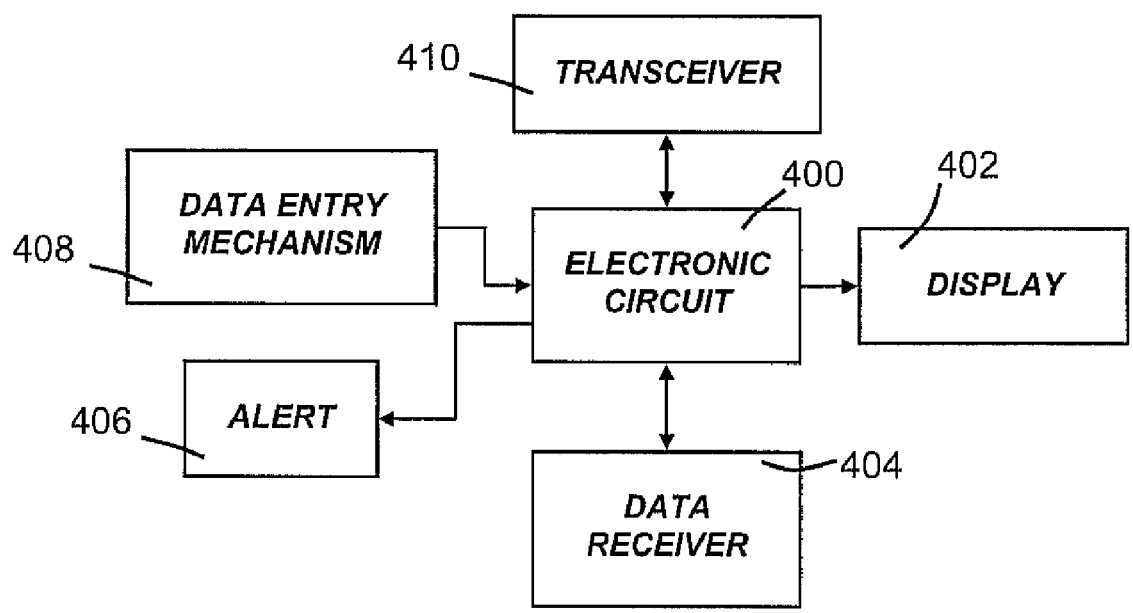
FIG. 11 shows a schematic of a display unit.

FIG. 11 shows a simplified schematic of an example display unit, including electronic circuit 400, display 402 (including display driver circuit if necessary), data receiver 404, alert 406, data entry mechanism 408, and transceiver 410. The display may be an electronic display, such as a liquid crystal display, LED bargraph, or any matrix addressed, graphic and/or alphanumeric display. In this example, the data receiver is an authorization status receiver, here an electrical interface configured to receive an authorization status from an authorization device, and the electrical interface may comprise a pin-out, socket, plug, exposed conducting terminals, or other type of electrical connection. The electrical interface may further comprise a mechanism for mechanically stabilizing an electrical connection to an authorization device, such as a snap connection made to a complementary electrical interface, or other components such as will be familiar to those skilled in the electrical arts. The electrical interface may provide electronic communication with an authorization device such as a biometric scanner. In other examples, the data receiver may be provided by a wireless receiver (such as a wireless transceiver), for example receiving an authorization status over a wireless link. The alert may be a lamp, vibratory device, or acoustic device, and may provide an alert if for example, operation (such as fueling) is complete, authorization status has changed (for example from authorized to non-authorized, so that the equipment status changes from operational to non-operational), operational parameters are outside predetermined ranges (e.g. excessive or too slow fueling rate), initiation of a hazardous operation, or other condition that would benefit from enhanced attention of a person. The data entry mechanism may include keys, a keypad, stylus entry, voice recognition, or other data entry approach, e.g. for receiving inputs from an equipment operator. In some examples, a data entry mechanism such as these may be used as a data receiver to obtain authorization (such as an authorized PIN number), identifying information, or desired operational parameters (such as time or rate of equipment operation). The transceiver may be used to receive equipment operational parameters for visual representation on the display. In other examples, a wireless receiver may be used both as the data receiver (to receive authorization status), and to receive operational parameters. Not all described elements may be present, and additional elements (such as other radio communication functionality) may also be present.

For fueling applications, a wireless transmitter may be installed in a fuel truck, for example as part of the base station, and transmit information to the display unit. A display unit may receive data from the biometric scanner and/or from a base station, and shows the information on a display. For fueling applications, the base station may be located on a fuel truck and include a transmitter, and source of the displayed information may be a fuel flow register.

Displayed information may originate from one or more equipment operation monitors. Parameters that may be displayed, depending on the operation, include time of operation, volume pumped, temperature, cost (e.g. fuel cost), internal battery charge condition, signal strength (e.g. from a wireless source of displayed data), and the like.

The physical form of the display unit (as a cradle for a portable biometric scanner or other form) may be a pendant that can hang from a tie around the neck, a wrist worn device, configured to be supported by a belt clip, otherwise supported by a person's body or clothing, part of an electronic device having additional functions (such as a personal digital assistant laptop, tablet PC, or other computer), clipped to a vehicle sun visor, a vehicle display, or other form.

In other examples, the display unit may provide an audible signal, for example to assist a person with sight problems. Audible alerts may be provided, for example near or at the end of an operation, or a voice synthesizer used to announce operational parameters.

Example Apparatus without a Biometric Scanner

In some examples of the present invention, a biometric scanner may not be needed, or is not used in physical conjunction with the display unit.

In any example described, the biometric scanner may be replaced by an authorization device, for example an authorization device transmitting an authorization signal. The authorization device may be operable to provide the authorization signal without requiring a biometric input. A user may be identified using a biometric scanner at one location (for example, at a security checkpoint), then be provided with an authorization device that transmits an authorization signal, either continuously, on demand, or as otherwise required. An authorization device used in this way may be pre-programmed to cease function after a predetermined time (such as a work shift), otherwise configured to prevent use beyond a certain time interval, or provide authorization codes that expire after a predetermined time. An authorization device may be a data card (such as a smart card or memory card), prepaid ticket, identity card, card having a magnetic strip or other data storage capability, or other physical form. In this context, the term card may refer to an object having the approximate dimensions of a credit card, for example rectangular with length and width dimensions in the range 5 cm-10 cm. However, all examples are representative and not limiting.

In other examples, an authorization device may have an alphanumeric pad (such as a numeric keypad) that accepts an access code from an authorized user. For example, the authorized user may input an access code into the authorization device, which then identifies the authorized user to the authorization device. The authorization device may also be a smart card.

Applications

Applications of the present invention include improved methods and apparatus for fueling applications (including aviation fueling), operation of dangerous equipment (such as sandblasters, construction equipment, and the like), hazardous material handling, and security applications (such as security checkpoints, access to restricted areas, and the like). The controlled equipment may include fuel dispensers, chemical processing and/or handling equipment, radioactive material handling, vehicles (for example, operational control on land vehicles, ships, airplanes, and the like), access control devices (such as barriers, locks, building, or site entrances), automatic teller machines (ATMs), and the like.

For example, a portable device according to an example of the present invention can be used as a safety interlock, whereby operation of equipment is only allowed while an authorization signal is received from the portable device. The authorization signal may include a biometric signature (for example, data derived from a biometric sensor such as a fingerprint reader, or data indicating that a biometric input has been accepted). The portable device may include a biometric sensor, so that equipment operation is allowed only if an acceptable biometric input is received by the biometric sensor, such as a finger placed on a fingerprint reader. In some examples, a maintained biometric input is needed to allow continued operation of the equipment, or in other examples this may not be needed.

Patents, patent applications, or publications mentioned in this specification are incorporated herein by reference to the same extent as if each individual document was specifically and individually indicated to be incorporated by reference. In particular, the following documents are incorporated by reference: U.S. Prov. Pat. Apps. Ser. Nos. 60/892,313 and 60/892,312 (both filed Mar. 1, 2007), and US Pub. Pat. App. 2007/0055888 to Miller et al.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. An apparatus for facilitating operation of equipment, the apparatus comprising:
   a display unit, the display unit having:
      a housing;
      an electronic display;
      an electronic circuit; and
      a data receiver;
   a biometric scanner, the biometric scanner including a biometric sensor, the apparatus providing an authorization signal when an authorized biometric input is detected by the biometric sensor,
   the display unit being operable to receive an authorization status for operation of the equipment from the biometric scanner, and to display the authorization status and the operational parameters of the equipment on the electronic display; and
   an equipment control system allowing the equipment to operate when the authorization signal is provided,
   the equipment control system preventing the equipment from operating after the authorization signal is no longer provided,
   the equipment control system being located in a fuel truck,
   the equipment being a fueling system allowing transfer of fuel from the fuel truck to an airplane,
   the display unit having a cradle to receive the biometric scanner, the cradle for the biometric scanner including a recess in the housing adapted to receive the biometric scanner, and an electrical interface within the recess allowing electrical communication between the biometric scanner and the display unit.

2. The apparatus of claim 1, the biometric scanner transmitting the authorization signal when the authorized biometric input is received from an authorized operator.

3. The apparatus of claim 1, wherein the equipment control system prevents the equipment from operating within ten seconds of the authorization signal being no longer received from the biometric scanner.

4. The apparatus of claim 1, wherein the equipment control system includes a switch, the switch being actuated so as to allow operation of the equipment as long as the equipment control system receives the authorization signal from the biometric scanner.

5. The apparatus of claim 1, wherein the equipment control system includes a deadman switch, actuation of the deadman switch allowing operation of the fueling system.

6. The apparatus of claim 1, the display unit receiving operational parameters from an equipment operation monitor.

7. The apparatus of claim 1, wherein the biometric scanner includes a fingerprint reader, the authorized biometric input being an input fingerprint from an authorized operator.

8. The apparatus of claim 7, wherein the biometric scanner further includes a memory, the biometric scanner identifying the authorized biometric input as being from the authorized operator by comparing the authorized biometric input with stored biometric data in the memory.

9. A process for allowing operation of equipment by an authorized operator, the process comprising:
   receiving a biometric input from an operator;
   determining if the biometric input is from the authorized operator;
   transmitting an authorization signal as long as the biometric input is provided by the authorized operator;
   operating the equipment only while the authorization signal is transmitted;
   displaying equipment operation data to the authorized user on a display unit,
   the display unit receiving the biometric scanner in a cradle, the cradle including a recess in the housing of the display unit, adapted to receive the biometric scanner, and an electrical interface within the recess allowing electrical communication between the biometric scanner and the display unit; and
   disabling the equipment shortly after the authorization signal is terminated,
   the equipment being a fueling system,
   the process being a process for allowing operation of the fueling system at an airport by the authorized operator.

10. The process of claim 9, wherein disabling the equipment occurs within ten seconds of the authorization signal being terminated.

11. An apparatus for facilitating safe operation of equipment by an authorized operator, the apparatus comprising:
   a biometric scanner, the biometric scanner providing an authorization signal while the biometric scanner is receiving a biometric input from the authorized operator;
   a display unit, including
      a housing;
      an electronic display;
      an electronic circuit; and
      a data receiver,
   the display unit being operable to receive an authorization status for operation of the equipment using the data receiver, and to display the authorization status and operational parameters of the equipment on the electronic display; and
   an equipment controller, allowing the equipment to operate while the equipment controller receives the authorization signal from the biometric scanner,
   the equipment controller preventing the equipment from operating after the authorization signal is no longer received from the biometric scanner,
   the equipment being a fueling system allowing transfer of fuel to an airplane,
   the display unit having a cradle to receive the biometric scanner, the cradle for the biometric scanner including a recess in the housing adapted to receive the biometric scanner and an electrical interface within the recess allowing electrical communication between the biometric scanner and the display unit.

12. The apparatus of claim 11, wherein the data receiver is a wireless receiver or an electrical interface.

13. The apparatus of claim 11, the data receiver being an electrical interface configured to form an electrical communications link with the biometric scanner when the biometric scanner is located within the recess.

14. The apparatus of claim 11, the biometric scanner and the display unit being mechanically coupled when the authorization device is located within the recess in the housing of the display unit.

15. The apparatus of claim 11, the display unit including a wireless receiver,
   the wireless receiver receiving the operational parameters for the equipment, the operational parameters of the equipment being displayed on the display.

* * * * *